H. R. KRUEGER.
UNDERBORING TOOL.
APPLICATION FILED JULY 3, 1918.
1,312,737.
Patented Aug. 12, 1919.
2 SHEETS—SHEET 1.
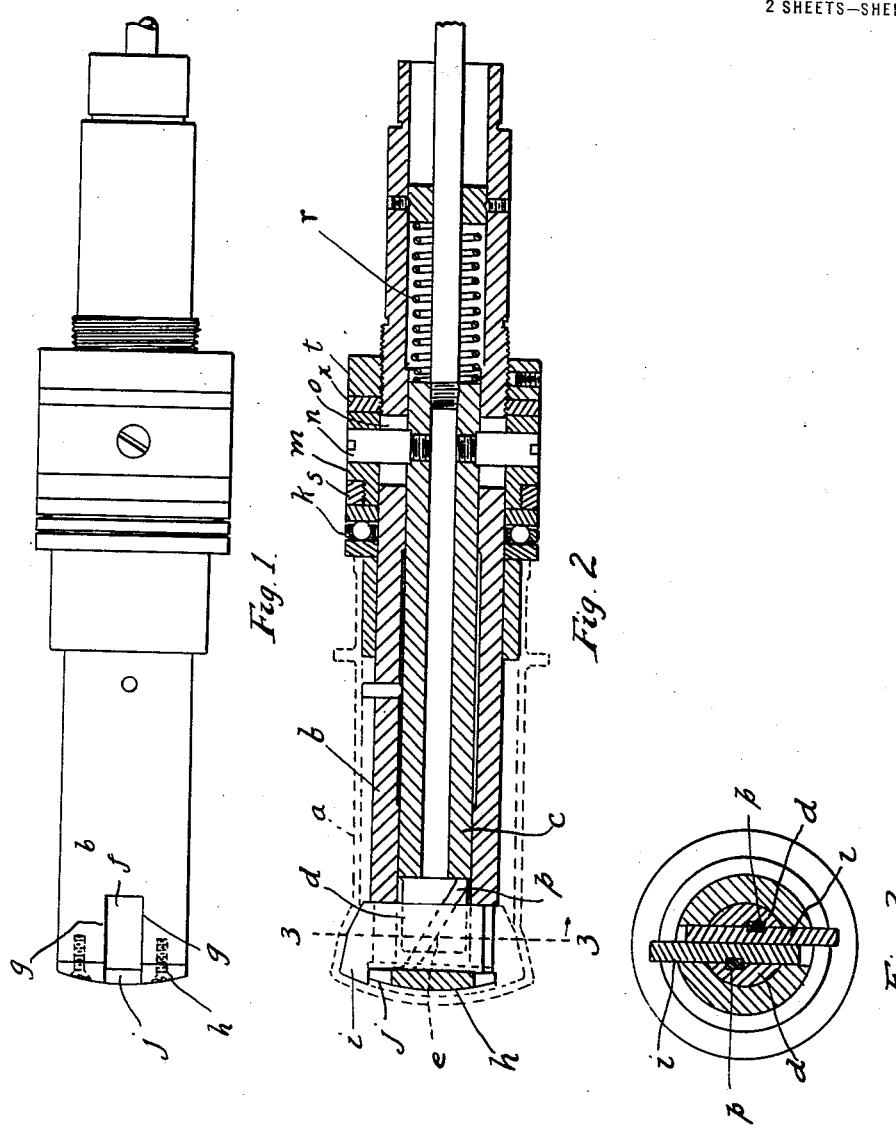
Inventor
Henry R. Krueger
By Stuart C. Barnes
Attorney

H. R. KRUEGER.
UNDERBORING TOOL.
APPLICATION FILED JULY 3, 1918.

1,312,737.

Patented Aug. 12, 1919.
2 SHEETS—SHEET 2.

Inventor
Henry R. Krueger
By Stuart L. Barnes
Attorney

UNITED STATES PATENT OFFICE.

HENRY R. KRUEGER, OF DETROIT, MICHIGAN, ASSIGNOR TO CADILLAC TOOL CO., OF DETROIT, MICHIGAN, A CORPORATION OF MICHIGAN.

UNDERBORING-TOOL.

1,312,737.      Specification of Letters Patent.      Patented Aug. 12, 1919.

Application filed July 3, 1918. Serial No. 243,097.

*To all whom it may concern:*

Be it known that I, HENRY R. KRUEGER, a citizen of the United States, residing at Detroit, county of Wayne, State of Michigan, have invented a new and useful Improvement in Underboring-Tools, of which the following is a specification.

This invention relates to under-boring tools and comprises an under-boring tool which, when advanced into the work to a predetermined position of its travel, is caused to automatically spread the blades to perform the under-boring operation. The point at which the spread of the blades takes place can be adjustably regulated by an adjusting member on the tool. A second adjusting member which can be easily operated, regulates the amount of spread of the blades. These features will more particularly appear in the detailed description.

In the drawings,—

Figure 1 is an elevation of the tool.

Fig. 2 is a longitudinal section.

Fig. 3 is a cross section on the line 3—3 of Fig. 2.

Figure 4:
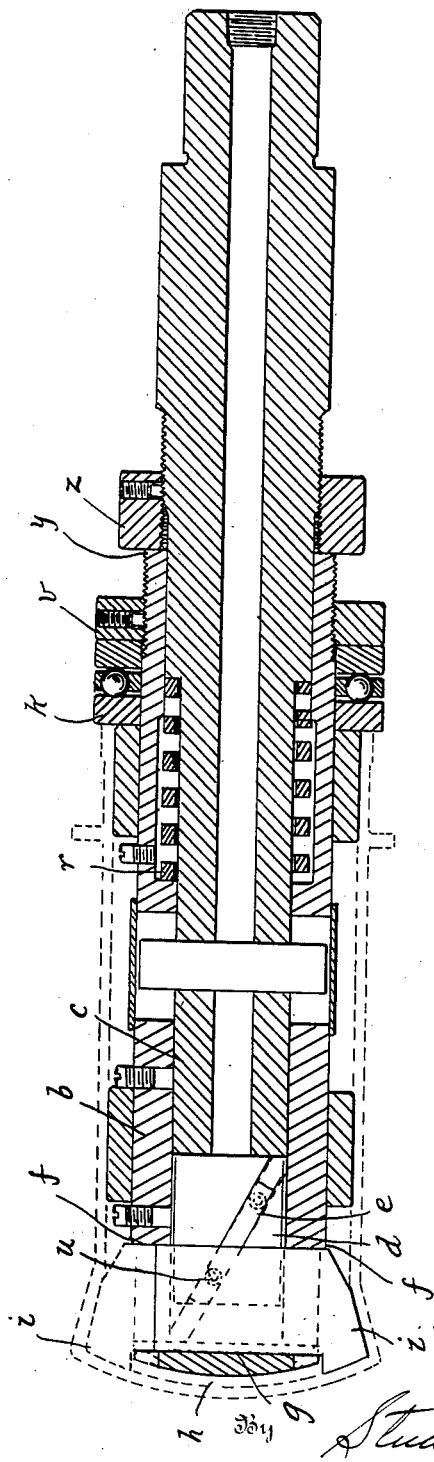
Fig. 4 is a longitudinal section of a modified form.

The dotted lines designated $a$ represent a cylindrical piece of work with an enlargement at the closed end of the cylinder. The tool is calculated to bore out this enlargement. This under-boring is accomplished by blades that are spread and set after the tool has entered the work as far as desired. This spreading is effected by relative movement between the sleeve $b$ and the boring bar $c$. The boring bar $c$ is forked at one end forming the blade beds $d$, $d$ which are obliquely slotted as at $e$. Likewise the sleeve $b$ is slotted at the end by the slot $f$ forming the blade guides $g$, $g$ in connection with the cap $h$ which is bolted on to the end of the sleeve. The blades are designated $i$ and the working ends of the blades may be wider than the main body of the blade as indicated in the drawings. The cap $h$ is slotted on opposite sides to allow the enlarged working end of the blade to withdraw into the tool. It will, therefore, be evident that the cap $h$ and the inside wall of the slot $f$ forms a guide for the transverse movement of the blades.

This transverse movement is effected by relative movement of the boring bar $c$ with respect to the sleeve $b$. When the tool advances upon the work, the work strikes the ball thrust ring $k$, as shown in Fig. 2. The boring bar $c$ is held stationary because the collar $m$ is pinned to the boring bar $c$ by the screw $n$ that travels in the slot $o$ of the sleeve $b$. The sleeve $b$ continues to move relatively to the work. The blades $i$ have oblique key-ways, as do also the blade beds $d$, $d$ of the boring bar, in which are located the keys $p$. These keys $p$, $p$, may be fitted tightly into the oblique key-ways of the blade beds and slidingly into the oblique grooves of the blades, or vice versa. This is immaterial. These keys extend to substantially the full length of the grooves and keyways, and consequently present a maximum resistance to shearing strains, which are very great in a device of this character.

Now obviously when this relative movement takes place between the sleeve bearing the blades constrained to move only transversely and the boring bar provided with the blade rests having the oblique keys engaging the blades, the blades are bound to spread. Relative movement between the sleeve and the boring bar is permitted by reason of the pin and slot connection referred to, while the coil spring $r$ tends to keep the sleeve $b$ drawn back upon the boring bar so as to hold the blades $i$ in unspread position. Hence, just as soon as pressure of the work upon the thrust bearing is relieved, the blades withdraw into the sleeve and the work and the under-boring tool may be separated.

The adjusting ring $s$ by being screwed on to the threaded portion of the collar $m$ varies the relative position of the blades and the work when the blades are started to be spread, for obviously if the collar $s$ were turned upon the collar $m$ so as to move the collar $s$ to the left of the figure, the end of the work will cause relative movement of the sleeve and the boring bar at an earlier point and hence the blades will spread before they reach the extreme bottom as shown in Fig. 2.

By adjusting the nut $t$ on the threaded portion of the sleeve it will be seen that a variable stop for the collar $m$ is provided, which can limit the relative movement of the sleeve and the boring bar and consequently regulate the spread for the blades. $x$ is a feeler ring or gage.

In Fig. 4 I have shown a modified form of construction in which the blades have oblique slots and the beds $d$, $d$, of the boring bar $c$ have oblique slots and hence spread in the same way. The keys, however, are held in place by screws $u$ and are spread by the same relative movement between the sleeve and the boring bar. However, the sleeve $b$, is the member that is held stationary by the cylinder or work striking against the thrust collar $k$ which abuts against the adjusting collar $v$ that threads upon the sleeve $b$. Obviously by adjusting this collar along these threads the position at which the spreading operation is initiated can be changed. The amount of spread is regulated by the adjusting collar $z$ which can be adjusted along the threads on the boring bar to change the amount of relative movement that is permissible, for obviously when the collar $z$ strikes the shoulder $y$ the relative movement is stopped.

What I claim is:

1. An under-boring tool, comprising a sleeve having a guide-way opening in the side thereof near one end, a boring bar slidable within the sleeve and supporting a key in the form of a relatively long bar having an oblique disposition with respect to the axis of the boring bar, and a blade slidable in the said guide-way and provided with an oblique key-way in the form of a groove in one side of the blade that extends clear to one edge of the blade and has an opening thereat to allow the key to slide out of the end of said groove, whereby when relative movement takes place between the boring bar and the sleeve the action of the key and the oblique key-way in conjunction with the action of the guide upon the blade constrains the blade to slide in and out of the guide-way.

2. An under-boring tool, comprising a member provided with transverse guides, sliding blades guided therein and movable only transversely therein, a second member, one of the members arranged to have relative movement with respect to the other member when the latter is struck by the work, an adjusting ring on the member struck by the work for regulating such relative movement, and devices between the member not provided with guides and the blades for causing the blades to spread when relative movement takes place between the two said members.

3. An under-boring tool, comprising a member provided with transverse guides, sliding blades guided only transversely therein, a second member, one of the two members arranged to have relative longitudinal movement with respect to the other member, devices between said member not provided with guides and the blades for causing them to spread when relative movement takes place between the two said members, said relative movement being initiated by one of the members striking the work, and an adjusting device supported by said member struck by the work for varying the time when the said member strikes the work.

4. An under-boring tool, comprising two members which have relative movement when one of them strikes the work, one of the members being provided with transverse guides, sliding blades movable only transversely in such guides and constrained at either side edges by said guides, the other member and the blades being provided with oblique key-ways and obliquely-disposed keys in form of bars relatively long in a direction parallel to the key-way.

5. An under-boring tool, comprising two members arranged to have relative movement, one of them provided with transverse guides for engaging the sides and side edges of the blades, the other provided with oblique key-ways, one or more sliding blades provided with oblique key-ways and movable only slidingly and transversely in said guides, and keys in the form of bars engaging lengthwise in the said key-ways.

6. An under-boring tool, comprising a sleeve having a guide-way opening in the side thereof near one end, a boring bar slidable within the sleeve and supporting a key in the form of a bar having an oblique disposition with respect to the axis of the boring bar, and a blade slidable in said guide-way and provided with an oblique key-way complementary to said key so that when relative movement takes place between the boring bar and the sleeve the action of the key in the oblique key-way in conjunction with the action of the guide upon the blade constrains the blade to slide in and out of the guide-way.

7. An under-boring tool, comprising a sleeve having transverse guide-ways in its end, a boring bar adapted to have relative movement within the sleeve and provided with a forked end forming a pair of blade beds having oblique key-ways, sliding blades adapted to rest between the blade beds and be guided only transversely in the guides, the said blades being provided with oblique key-ways and obliquely-disposed keys in the form of bars lengthwise engaging in the key-ways to cause the blades to spread when relative movement takes place between the sleeve and the boring bar.

8. An under-boring tool, comprising a sleeve having a slotted end, a cap adapted to be bolted to the end of the sleeve to form a transverse guide in connection with the said slot, blades movable only transversely in the said guides, a boring bar provided with a forked end forming two blade beds having oblique key-ways, the said blades being provided with oblique key-ways and oblique keys adapted to engage in the said key-ways for the purpose of spreading the keys when relative movement takes place between the sleeve and the boring bar.

9. An under-boring tool, comprising a sleeve having guide-ways in its end, blades only transversely movable in said guide-ways, a boring bar adapted to engage about the said blades, devices between the boring bar and the blades to cause the blades to spread when relative movement takes place between the boring bar and the sleeve by the former sliding in the latter, and a collar pinned to the boring bar and engaging about the sleeve for striking the work to cause relative movement between the sleeve and the boring bar.

10. An under-boring tool, comprising a sleeve provided with transverse blade guides, blades guided only transversely in the same, a boring bar slidable in the said sleeve and having a portion engaging about the blades, devices between the said portions and the blades for causing the blades to spread in the said guides when relative movement takes place between the sleeve and the boring bar, a collar pinned to the boring bar and engaging about the sleeve, and a ring adjustable on said collar to determine the time when the collar receives impact from the work to initiate the relative movement between the boring bar and the sleeve.

11. An under-boring tool, comprising a sleeve provided with transverse guide-ways, blades guided only transversely in said guide-ways, a boring bar slidable in said sleeve and having portions engaging about the blades, devices between the said portions and the blades to cause the blades to spread when relative movement takes place between the boring bar and the sleeve, a collar pinned to the boring bar and adapted to receive impact from the work to initiate relative movement, and an adjustable nut on the said sleeve for limiting the movement of the collar to regulate the spread of the blades.

In witness whereof I have hereunto set my hand on the 22nd day of June 1918.

HENRY R. KRUEGER.